(12) United States Patent
Hatzav et al.

(10) Patent No.: US 8,559,068 B2
(45) Date of Patent: Oct. 15, 2013

(54) UNIFORM ILLUMINATION FOR CAMERA BASED IMAGING DEVICES

(75) Inventors: Iuval Hatzav, Culver City, CA (US); Ilan Ben-Shahar, Savion (IL); Giyora Sharaby, Moshav Neve Yarak (IL); Daniel Hatzav, Hod Hasharon (IL)

(73) Assignee: CSSN Inc. Card Scanning Solutions, Culver City, CA (US)

( * ) Notice: Subject to any disclaimer, the term of this patent is extended or adjusted under 35 U.S.C. 154(b) by 285 days.

(21) Appl. No.: 13/185,510

(22) Filed: Jul. 19, 2011

(65) Prior Publication Data

US 2013/0021653 A1 Jan. 24, 2013

(51) Int. Cl.
*H04N 1/00* (2006.01)
*H04N 1/04* (2006.01)

(52) U.S. Cl.
USPC ........... 358/474; 358/475; 358/404; 348/262; 348/61

(58) Field of Classification Search
USPC .................... 358/474, 475, 404; 348/262, 61
See application file for complete search history.

(56) References Cited

U.S. PATENT DOCUMENTS

| | | | | |
|---|---|---|---|---|
| 7,821,679 B2 * | 10/2010 | Hatzav et al. | ................. | 358/474 |
| 7,948,665 B2 * | 5/2011 | Hatzav et al. | ................. | 358/475 |
| 2008/0285094 A1 * | 11/2008 | Hatzav et al. | ................. | 358/475 |
| 2013/0057664 A1 * | 3/2013 | Hatzav et al. | ................... | 348/61 |

* cited by examiner

*Primary Examiner* — Charlotte M Baker
*Assistant Examiner* — Rury Grisham (57) ABSTRACT

A camera system for imaging a document including an enclosed imaging-optical-chamber, at least one camera mounted inside the imaging-optical-chamber and having a lens defining the primary FOV of the camera, at least one light source for illuminating the document; at least one light-occluding structures, wherein each light sources are operatively coupled with a light-occluding structures, a glass-window, wherein the document is operatively disposed on the glass-window, and wherein the glass-window extends the FOV of the camera thereby forming an extended FOV of the camera. The system further includes at least one mirror operatively coupled with at least one of the light sources. Preferably, the light sources are disposed inside the primary FOV of the camera, such that the imaginary light-source of the light source is disposed outside the extended FOV of the camera.

10 Claims, 9 Drawing Sheets

UNIFORM ILLUMINATION FOR CAMERA BASED IMAGING DEVICES

FIELD OF THE INVENTION

The present invention relates to illumination systems and methods for cameras, and more particularly to an illumination system and method facilitating a small-form imaging device for imaging a business card, an ID card, a passport and the like documents, and providing an illumination which is substantially uniform.

BACKGROUND OF THE INVENTION

There exist in today's market imaging devices capable of reading documents such as ID cards, drivers license, business cards and the like. In imaging devices that include an imaging sensor array, based on technologies such as a CCD or CMOS, it is required to illuminate the imaged document. It is desired that the illumination will of high intensity and substantially uniform, in order to obtain a substantially true image of the imaged document.

The document is typical place on the surface of a substantially flat and substantially transparent panel, typically, with no limitation, made of glass (herein, also referred to as "glass-window"). But the glass surface is also a reflective surface, returning a portion of the incident light rays striking the transparent glass surface. Thereby, the image frame acquired from the imaged document is distorted. An internal light source that directly illuminate the glass-window bring are reflected from the glass surface, thereby forming "hot spots" that distort the uniformity of the illumination of the imaged document, and thereby causing the image of the imaged document not to be a substantially true image of the imaged document.

Figure 1A:
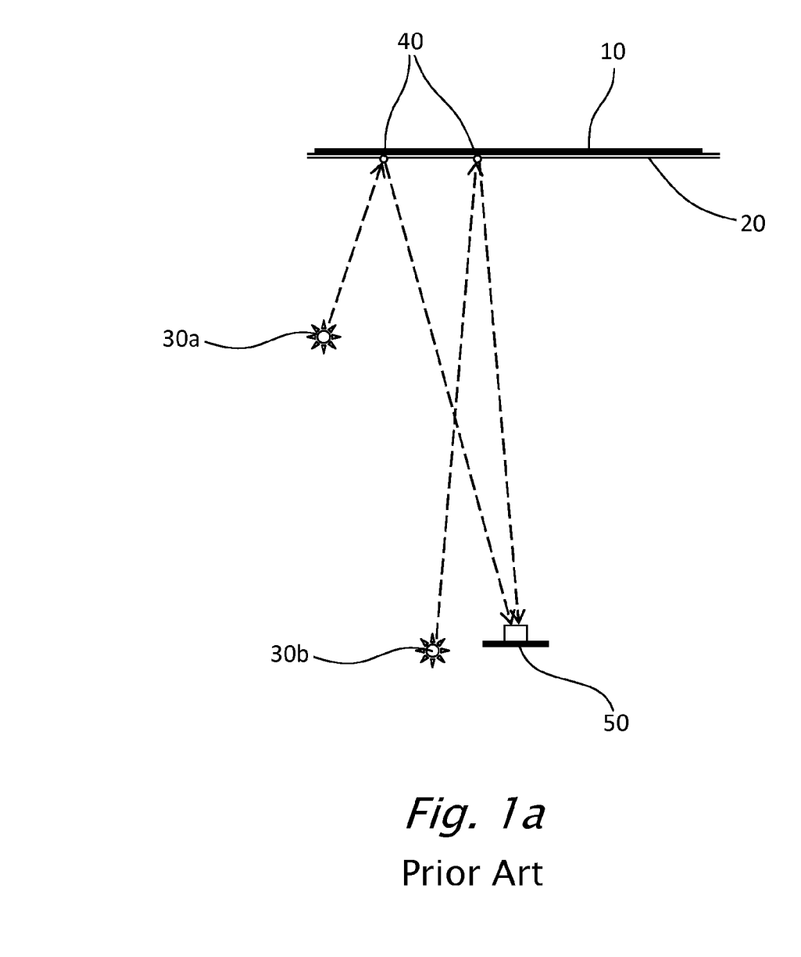
FIG. 1a (prior art) illustrates the hot spot problem caused by direct illumination of the imaged document or external light sources.
Figure 1B:
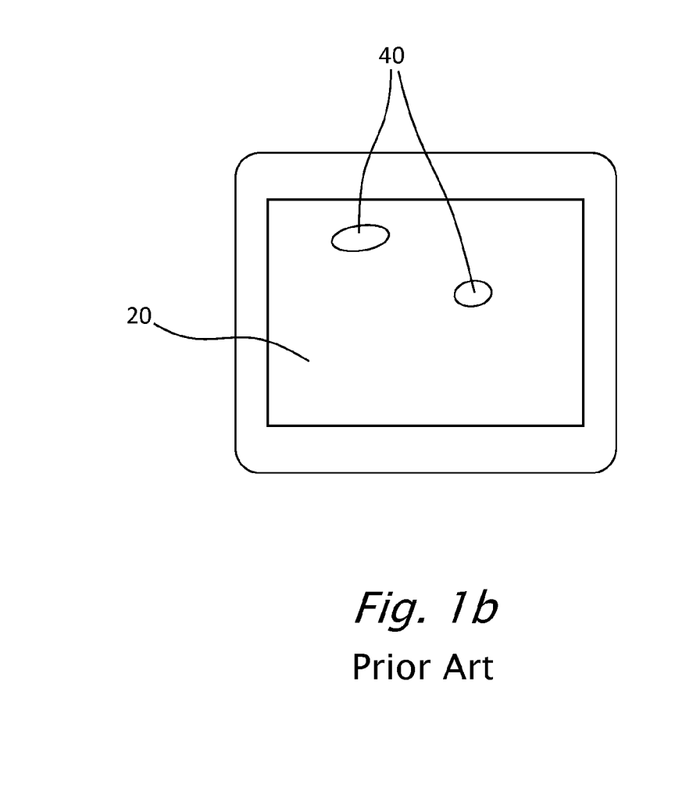
FIG. 1b (prior art) depicts a hot spot caused by direct illumination of the imaged document and a substantially transparent window in front of the imaged document.

Reference is now made to FIG. 1a (Prior art) and to FIG. 1b (Prior art). FIG. 1b depicts a pair of hot spots 40 caused by direct illumination of the imaged document disposed on the external surface of a glass-window 20, as viewed from inside the camera housing. FIG. 1a illustrates how hot spots 40 are formed by direct illumination of the imaged document 10 disposed on the external surface of a glass-window 20. When imaging document 10 with a camera 50, document 10 needs to be illuminated. In a conventional illumination method, as shown in FIG. 1a, illumination sources 30a and 30b are positions to directly illuminate glass-window 20. Such configuration enables the return of the majority of light to the lens of camera 50, but gives rise to a hot spot 40, where the light source (30) itself is imaged by camera 50.

Figure 2:
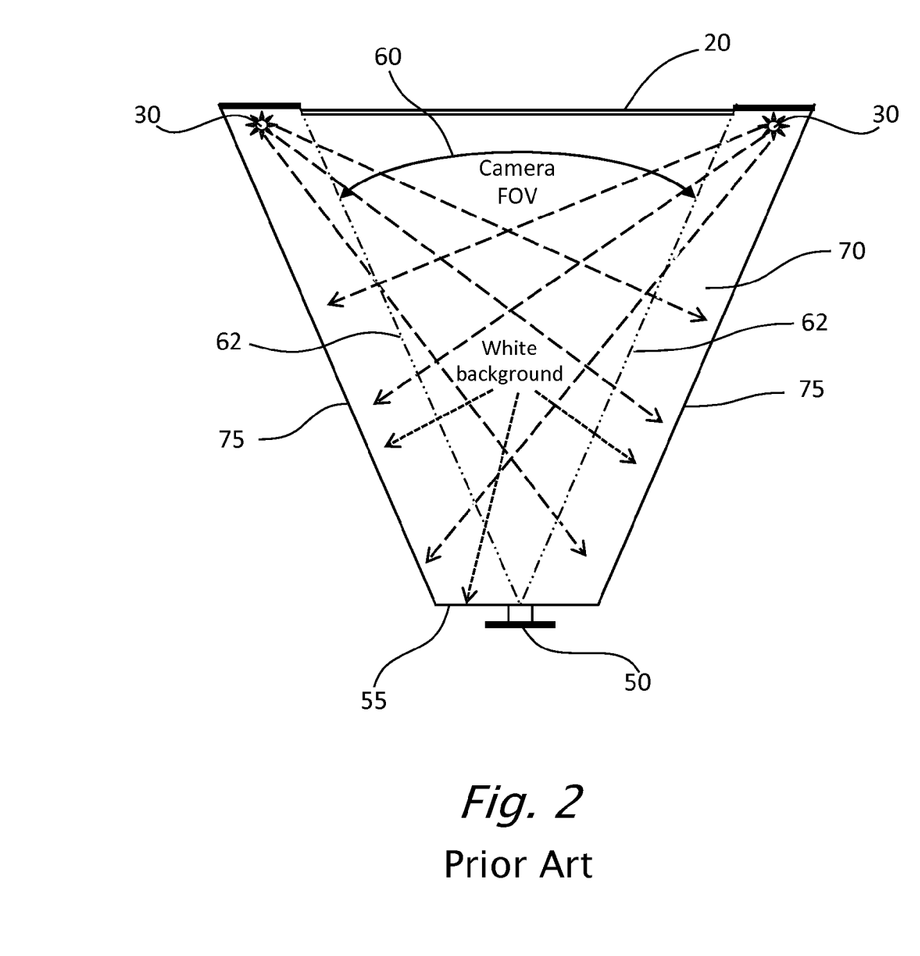
FIG. 2 (prior art) illustrates an indirect illumination configuration, as provided by some prior art document imaging devices.

US patent application 20080285094, by Hatzav et al., provides a configuration method of the illumination system that reduces the hot spot problem, by disposing the light sources outside the field of view (FOV) of the camera. Reference is now made to FIG. 2 (Prior art), illustrating a pair of light sources 30 that are disposed outside the conventionally pre-configured FOV 60 of camera 50, which FOV 60 of camera 50 is denoted by virtual lines 62. Furthermore, the inner walls 55 and 75 of inner space 70 of the prior art document imaging device are white to further enhance the uniformity of the illumination. However, back-light (indirect) illumination brings about loss of light intensity and requires a high intensity light source. Furthermore, hot spots of lower intensity, with respect to direct illumination, still appeared in the image formed.

Thus there is a need for and it would be advantageous to have a camera based imaging device that has an illumination system that provides uniform illumination with no reflections, hot spot effects, and other illumination artifacts, as well as avoiding substantial loss of illumination intensity.

SUMMARY OF THE INVENTION

In view of the limitations now presented in the prior art, the present invention provides a new and useful system that facilitates enhancement of the uniformity of illumination in imaging device for imaging documents, utilizing an image sensor array.

Figure 3:
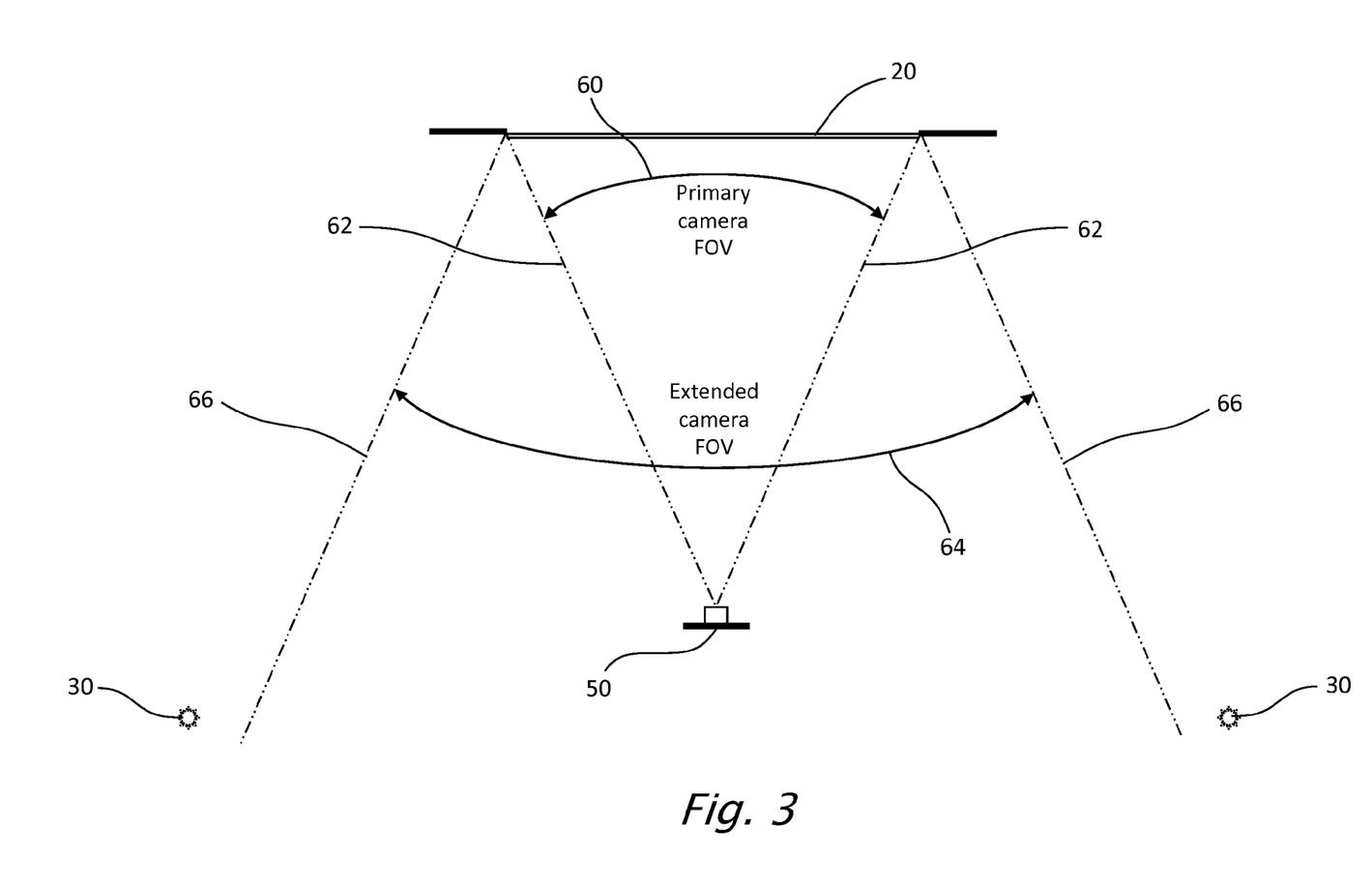
FIG. 3 schematically illustrates the full camera FOV, in an imaging device for imaging a document disposed on a glass-window.

Reference is now made to FIG. 3, a schematic illustration of the full FOV 64 of a camera 50, in an imaging device for imaging a document disposed on a glass-window 20. It has been determined that the full FOV of camera 50, in an imaging device for imaging a document disposed on glass-window 20, is substantially wider, since glass-window 20 is also acting as a partial mirror, and thereby acting as an extending light source. Therefor, the primary (conventional) FOV 60, denoted by virtual lines 62, is folded by partial-mirror glass-window 20, to form the extended FOV 64, denoted by virtual lines 66. Hence to avoid the hot spot problem, one should locate the light source not only outside the primary FOV 60, but also outside the extended FOV 64. FIG. 3 also illustrates a pair of light sources 30 disposed outside extended FOV 64 of camera 50, so that the image sensor does not directly view light sources 30. It should be noted that when the imaging device is packed inside an enclosed housing, the housing has to be large enough to accommodate all light sources 30.

It is then a principle intention of the present invention to provide an imaging device for imaging documents that has a small form and that includes an illumination system that facilitates substantially uniform illumination, while illuminating the document substantially directly, and preventing the formation of hot spots.

According to the teachings of the present invention, there is provided a camera system for imaging a document including an enclosed imaging-optical-chamber; at least one camera mounted inside the imaging-optical-chamber, wherein the camera is configured to acquire image frames of at least a portion of the document, and wherein the camera includes a lens defining the primary FOV of the camera; at least one light source for illuminating the portion of the document being imaged; at least one light-occluding structures, wherein each of the light sources is operatively coupled with at least one of the light-occluding structures; a glass-window, wherein the document is operatively disposed on the external surface of the glass-window, and wherein the glass-window extends the FOV of the camera thereby forming an extended FOV of the camera; and at least one mirror operatively coupled with at least one of the light sources.

The least one light source is disposed inside the primary FOV of the camera. Each of the light-occluding structures prevents each of the operatively coupled light sources from directly illuminating the glass-window, and each of the light-occluding structures facilitates each of the operatively coupled light sources to directly illuminate the operatively coupled mirror. The light rays illuminating the mirrors reflect from the mirrors to illuminate at least a portion of the glass-window, and thereby, also illuminate the portion of the document being imaged.

Optionally, the imaged document is an identity document.

Preferably, the at least one light source is disposed inside the primary FOV of the camera, such that the imaginary light-source of the light source is disposed outside the extended FOV of the camera.

Preferably, all internal walls of the imaging-optical-chambers, except for the at least one mirror and the glass-windows, are painted in black. Optionally, the internal walls of the imaging-optical-chambers, except for the at least one mirror and the glass-windows, coated with light absorbing material. Preferably, all the walls of the optical chamber are opaque, except for the glass-window.

Preferably, the at least one light source of the illumination system is selected from the group of light sources type: Infra Red (IR), Ultra Violate (UV), Visible Light (VL) and fluorescence image. Preferably, the at least one light source of the illumination system is a LED light source. Optionally, the at least one light source of the illumination system is a halogen light source.

An aspect of the present invention is to provide a method for imaging a document, including the step of providing a camera system as described hereabove, wherein the at least one light source is disposed inside the primary FOV of the camera, such that the imaginary light-source of the light source is disposed outside the extended FOV of the camera. The method further includes the steps of illuminating the document with the at least one imaginary light-sources, and acquiring at least one image frame of at least a portion of the document, by at least one camera.

BRIEF DESCRIPTION OF THE DRAWINGS

The present invention will become fully understood from the detailed description given herein below and the accompanying drawings, which are generally not drawn to scale and are given by way of illustration only and thus, not limitative of the present invention, and wherein.

DETAILED DESCRIPTION OF THE INVENTION

The present invention is an improved imaging device for imaging business cards, ID cards, passports and the like documents, having illumination which is substantially uniform. The imaging device includes a camera and at least one light source such as a LED light source (herein after referred to as LED), the light source being outside the primary and secondary field of view (FOV) of the camera. The imaging device also includes a fixed cover that prevents internal light from being transmitted outside the optical chamber of the imaging device, and more importantly, prevents external light from entering the optical chamber of the imaging device and possibly distorting the uniformity of the illumination.

Before explaining embodiments of the invention in detail, it is to be understood that the invention is not limited in its application to the details of construction and the arrangement of the components set forth in the host description or illustrated in the drawings.

Unless otherwise defined, all technical and scientific terms used herein have the same meaning as commonly understood by one of ordinary skill in the art of the invention belongs. The methods and examples provided herein are illustrative only and not intended to be limiting.

Figure 4:
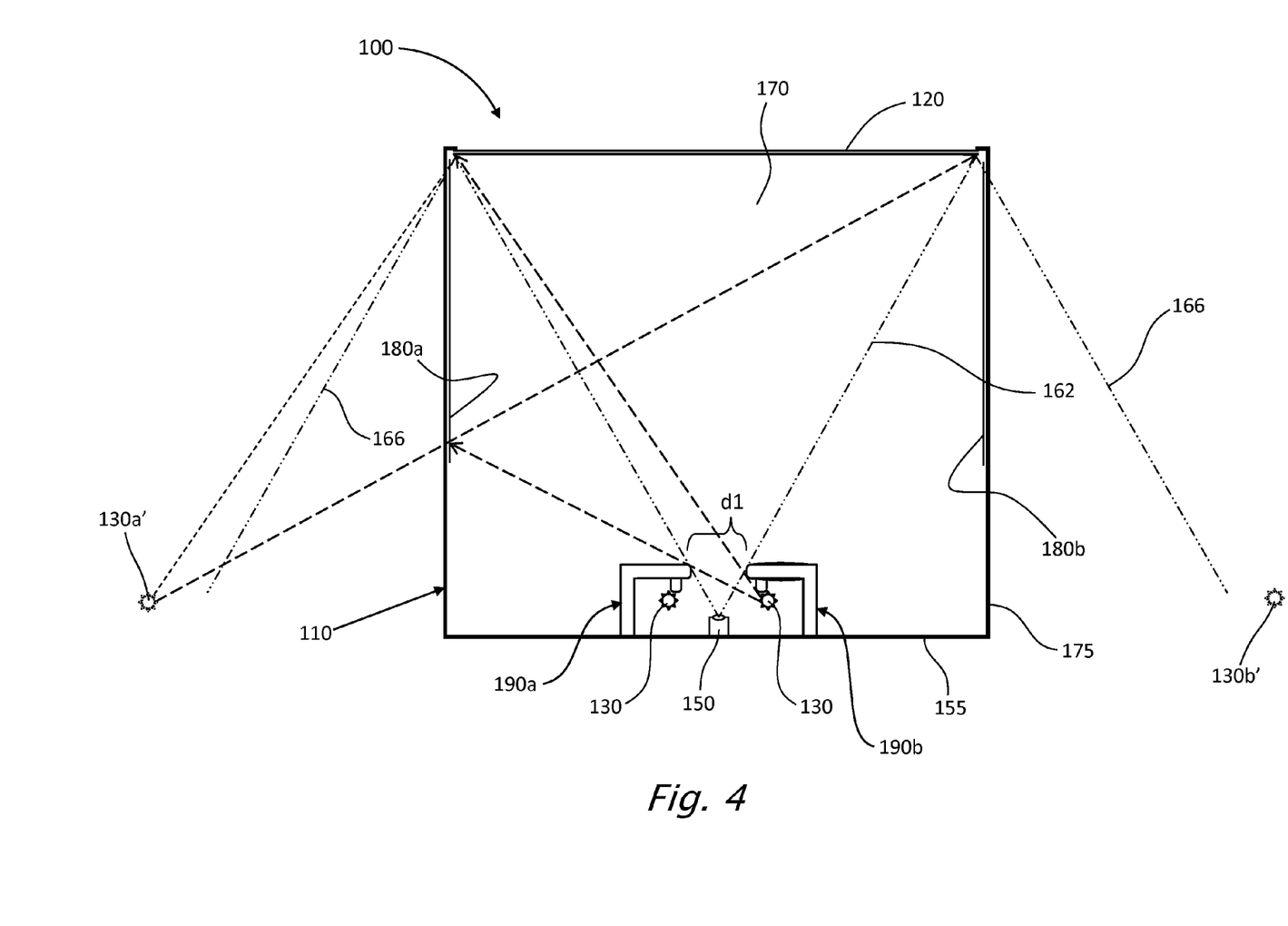
FIG. 4 is a schematic side view illustration of an imaging device, according to embodiments of the present invention, providing a substantially uniform illumination.

Reference is now made to FIG. 4, a schematic illustration of an imaging device 100, according to embodiments of the present invention, providing a substantially uniform illumination. Imaging device 100 includes a body 110 enclosing an imaging-optical-chamber 170, a camera 150, one or more light sources 130, light-occluding structures 190, mirrors 180 and a glass-window 120.

Figure 5:
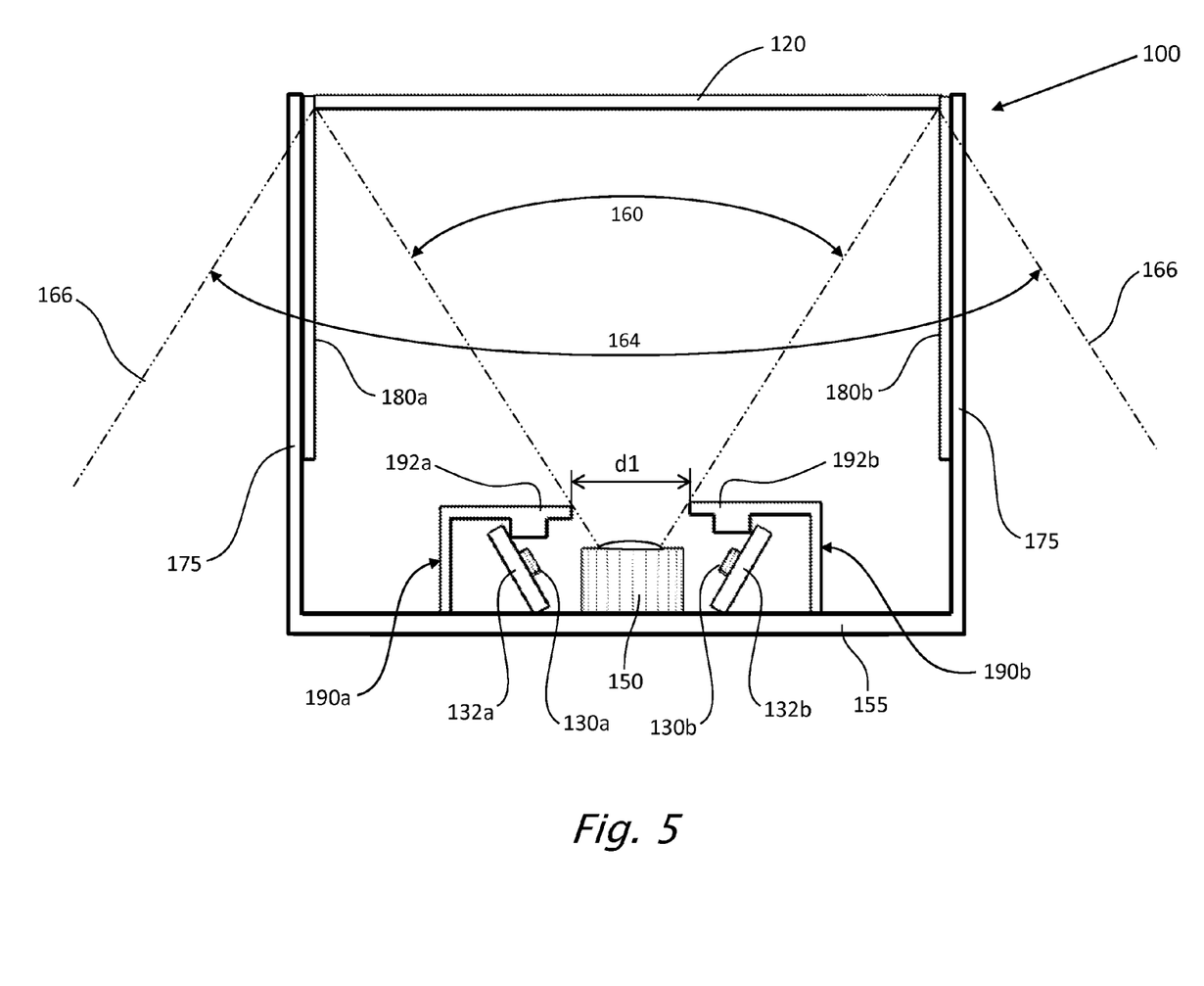
FIG. 5 is a side view illustration of the imaging device shown in FIG. 4, having a side wall removed for illustration purposes only.

Imaging-optical-chamber 170 is enclosed by glass-window 120 and by a body 110, body 110 including camera wall 155 and side walls 175. Reference is also made to FIG. 5, a side view illustration of imaging device 100; and to FIG. 6, a perspective view illustration of imaging device 100. It should be noted that in FIGS. 5 and 6, a side wall has been removed for illustration purposes only.

Figure 6:
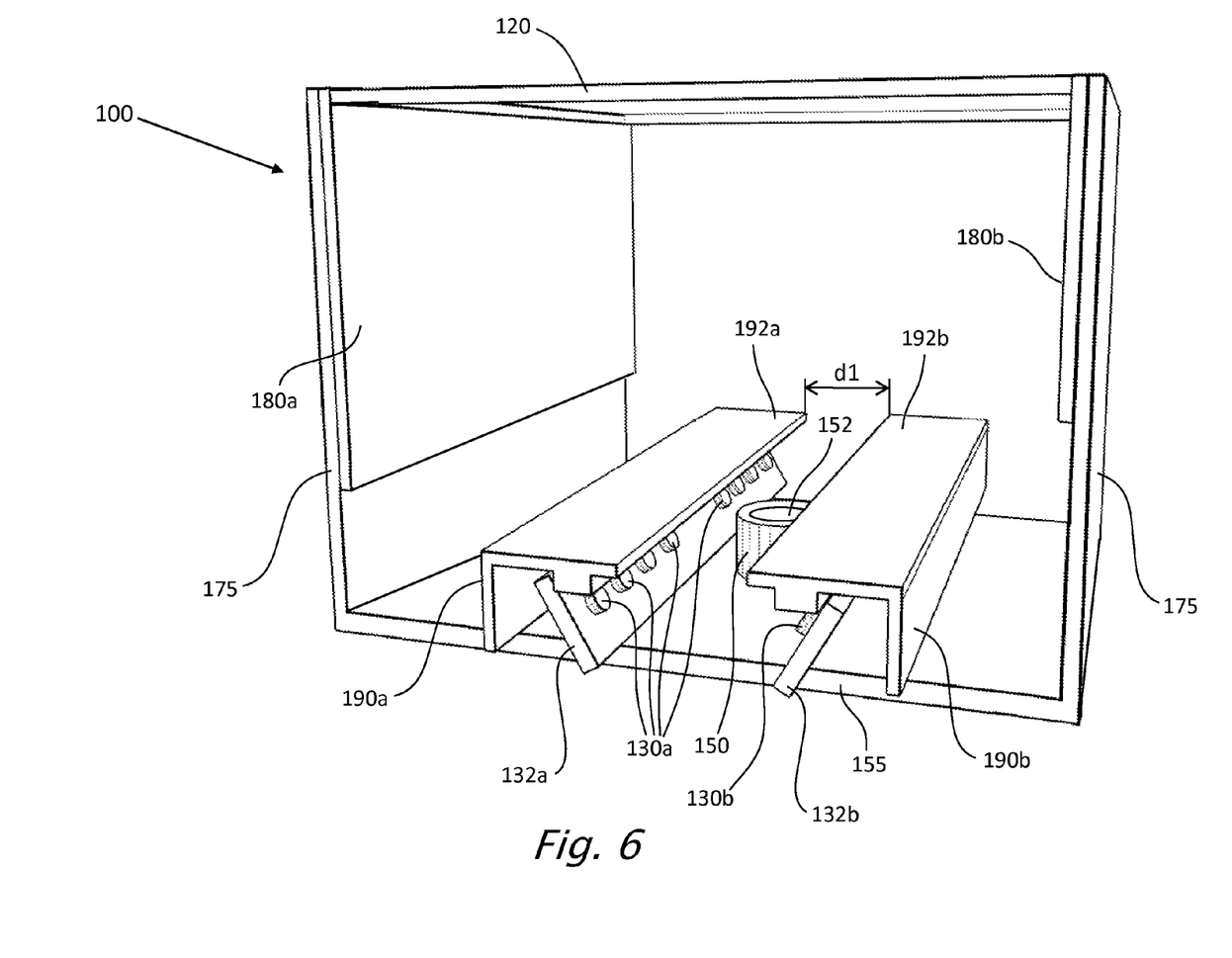
FIG. 6 is a perspective view illustration of the imaging device shown in FIG. 4, having a side wall removed for illustration purposes only.

Camera 150 is disposed on a camera wall 155 such that the primary FOV 160 of camera 150 views at least the whole of glass-window 120. Light sources 130 and light-occluding structures 190 are securely attached to either the internal surface of camera wall 155 or to the internal surface of selected side walls 175. Light sources 130 are typically attached by light source holders 132.

Light sources 130 and light-occluding structures 190 are disposed in a preconfigured location inside imaging-optical-chamber 170, such that light-occluding structures 190 delimit the primary FOV 160 of camera 150 to preferably view at least the whole of glass-window 120. The preconfigured location of light sources 130 is in occluded shelter zones formed by light-occluding structures 190, inside imaging-optical-chamber 170. The preconfigured location of light sources 130 is such that light-occluding structures 190 delimit the light arrays emitted from light sources 130 illuminate coupled mirrors 180, such that all light arrays, reflected from mirrors 180, cover substantially all of glass-window 120. Light-occluding structures 190 form a gap d1 between them, through which gap d1 the light arrays emitted from light sources 130 illuminate coupled mirrors 180. Hence, light-occluding structures 190 prevent direct illumination of glass-window 120, upon which the imaged document is disposed, and thereby, the document is illuminated only by imaginary light source 130'.

Figure 7:
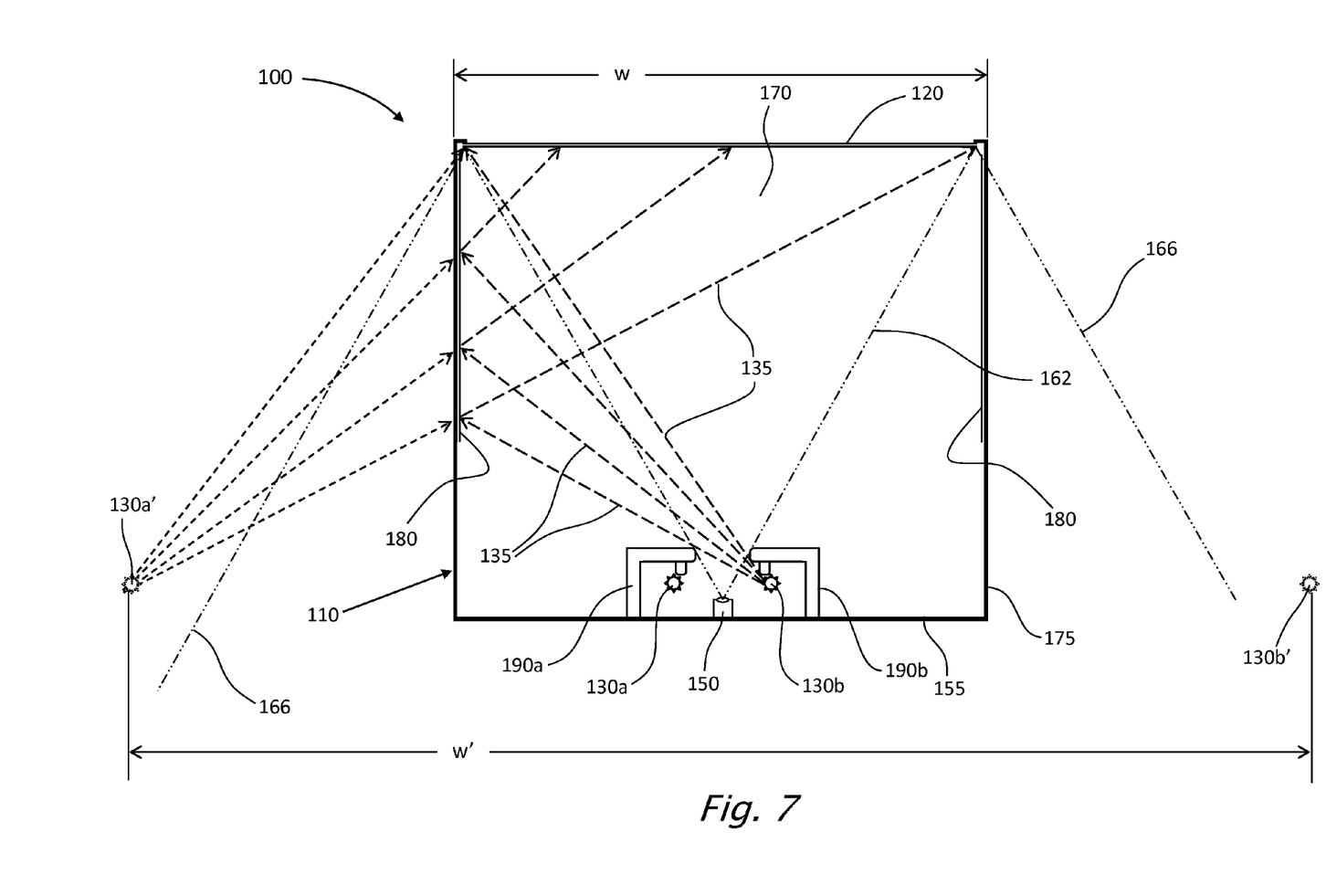
FIG. 7 is a schematic side view illustration of the optically involved members of the imaging device shown in FIG. 4, detailing the optical paths of the light rays and the relationship of the optical paths of the light rays with the primary and extended FOVs of the camera.

Reference is also made to FIG. 7, a schematic side view illustration of imaging device 100, detailing the optical paths of light rays 135 and relationship with the primary and extended FOVs, 160 and 164, respectively. Primary FOV 160 of camera 150 is denoted by virtual lines 162 and extended (full) FOV 164 of camera 150 is denoted by virtual lines 166. The optical effect of mirrors 180 is such, as if light sources 130a and 130b are positioned at the position of imaginary light sources 130a' and 130b', respectively, and similarly for all individual light sources 130.

Figure 8:
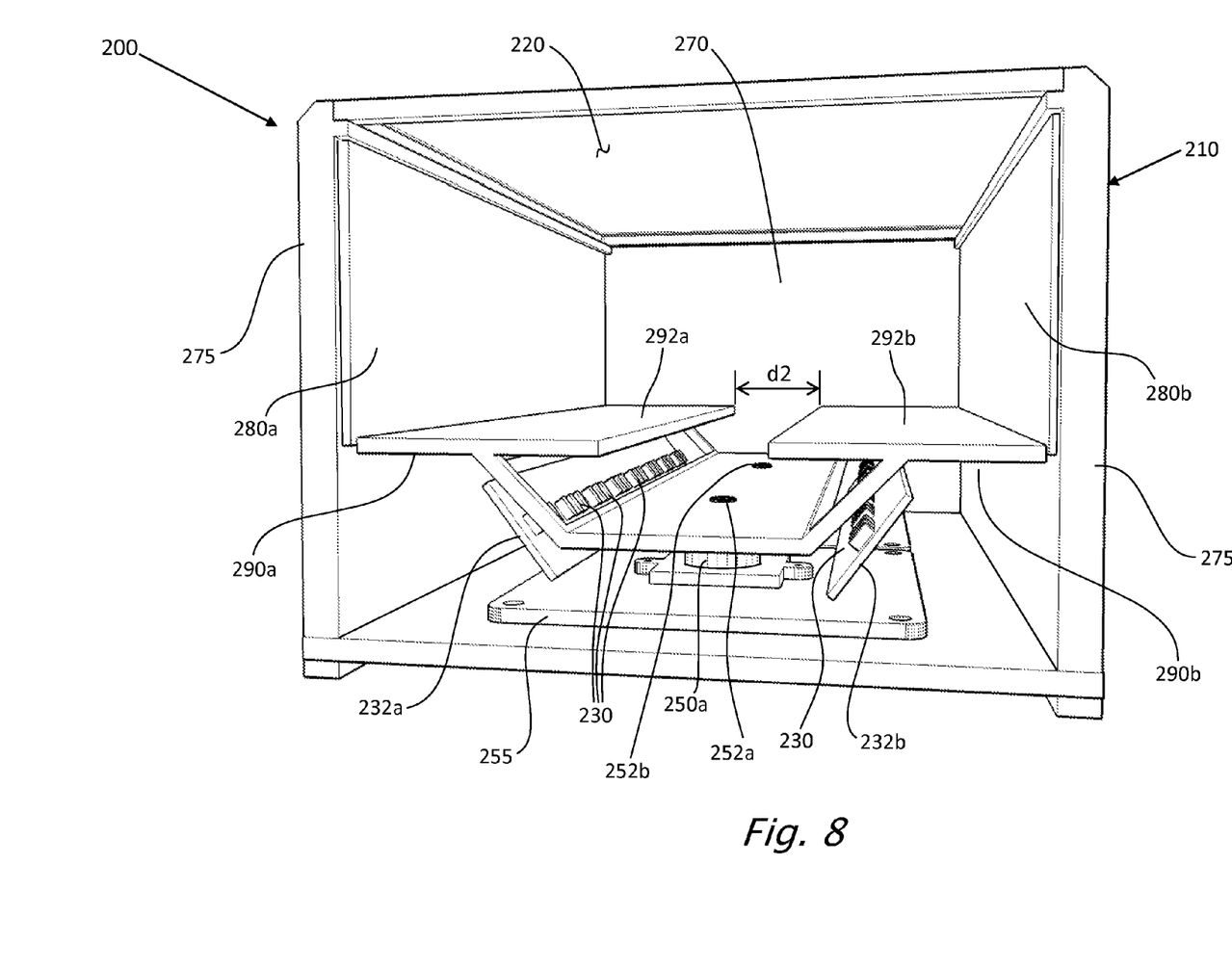
FIG. 8 is a perspective view illustration of an imaging device, having two adjacent image sensors and providing a substantially uniform illumination, according to embodiments of the present invention.

Reference is now made to FIG. 8, a perspective view illustration of imaging device 200, having two adjacent image sensors 250 and providing a substantially uniform illumination, according to embodiments of the present invention, wherein a side wall (the front wall, with reference to FIG. 8) has been removed for illustration purposes only.

Cameras 250 are disposed adjacently, wherein the respective FOVs are at least tangential and preferably, have some overlap. Such dual camera configuration is described in U.S. Pat. No. 7,821,679, given to Hatzav et al., which is hereby incorporated by reference in its entirety. Otherwise, imaging device 200 is structured according to the same principles as is imaging device 100.

Imaging device 200 includes a body 210 enclosing an imaging-optical-chamber 270, one or more pairs of cameras adjacently disposed 250, one or more light sources 230, light-occluding structures 290, mirrors 280 and a glass-window 220. Imaging-optical-chamber 270 is enclosed by glass-window 220 and by a body 210, wherein body 210 includes a camera wall 255 and side walls 275. Cameras 250 are disposed on a camera wall 255 such that the two primary FOVs of respective cameras 250 view at least the whole of glass-window 220.

Light sources 230 and light-occluding structures 290 are securely attached to either the internal surface of camera wall 255 or to the internal surface of selected side walls 275. Light sources 230 are typically attached by light source holders 232. Light sources 230 and light-occluding structures 290 are disposed in a preconfigured location inside imaging-optical-chamber 270, such that light-occluding structures 290 delimit the primary FOV of cameras 250 to preferably view at least the whole of glass-window 220. The preconfigured location of light sources 230 is in occluded shelter zones formed by light-occluding structures 290, inside imaging-optical-chamber 270. The preconfigured location of light sources 230 is such that light-occluding structures 290 delimit the light arrays emitted from light sources 230 illuminate coupled mirrors 280, such that all light arrays, reflected from mirrors 280, cover substantially all of glass-window 220. Light-occluding structures 290 form a gap d2 between them, through which gap d2 the light arrays emitted from light sources 230 illuminate coupled mirrors 280.

It should be further noted that in the embodiments shown in FIGS. 4-7, light sources 130 and light-occluding structures 190 are disposed inside imaging-optical-chamber 170, such that light sources 130 illuminate a pair of mirrors 180 disposed on respective side walls 175, and imaginary light sources 130' remain outside of FOV 164. These configurations are exemplary configurations are also possible and are within the scoped of the present invention. For example, mirrors can be disposed on the inner surfaces of all side walls 175, and light sources 130 and light-occluding structures 190 are disposed on four corresponding sides of camera 150.

Similarly for imaging device 200, light sources 230 and light-occluding structures 190 are disposed inside imaging-optical-chamber 270, such that imaginary light sources 230' illuminate a pair of mirrors 280 disposed on respective side walls 275, and imaginary light sources 230' remain outside of both the primary and extended FOVs.

It should be further noted that all internal walls of imaging-optical-chambers 170 and 270, except for mirrors 180 and 280, and a glass-windows 120 and 220, are painted in black and optionally, coated with light absorbing material, such that the is substantially no reflection of incident light rays.

Figure 9:
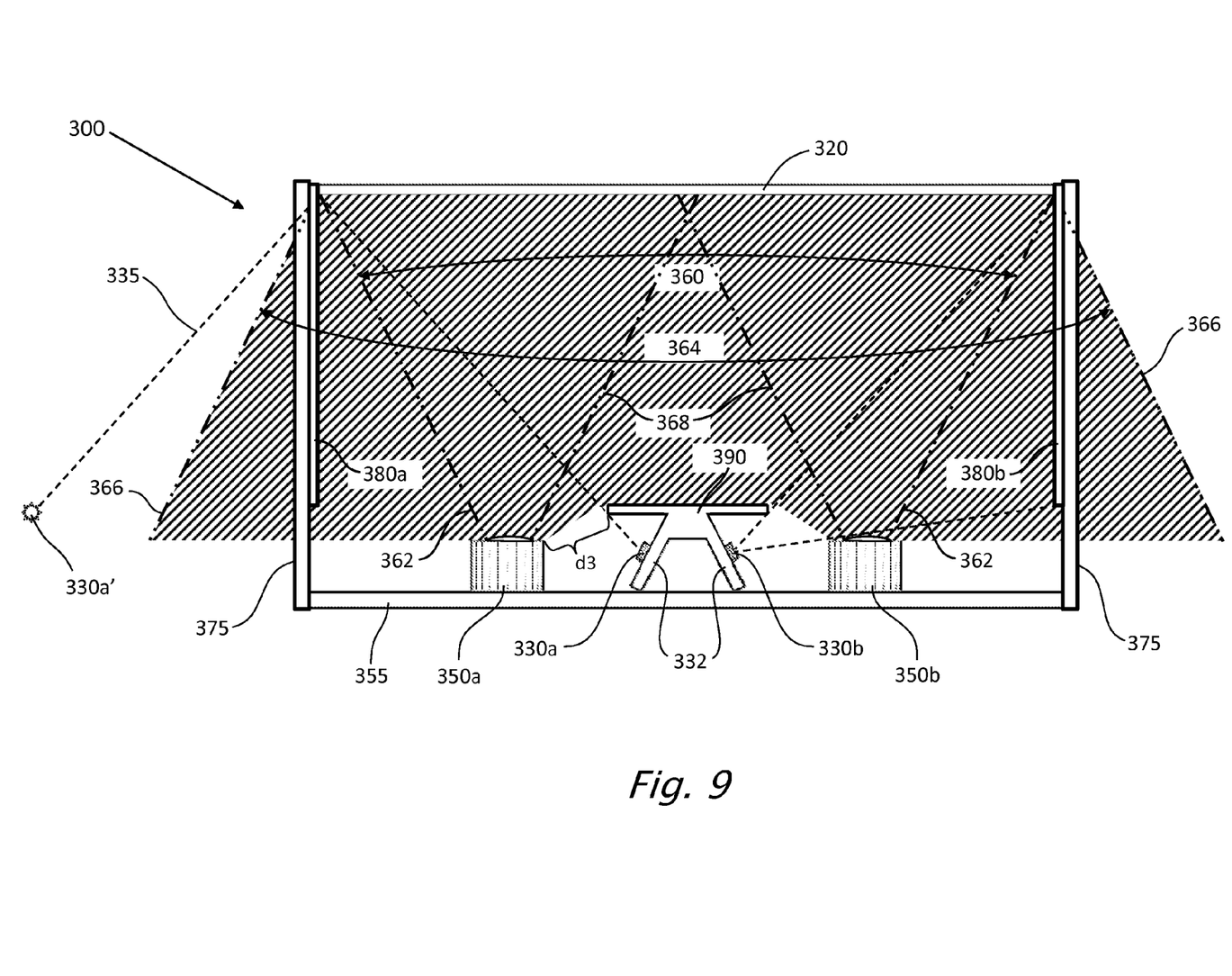
FIG. 9 is a side view illustration of the imaging device, having two adjacent image sensors and providing a substantially uniform illumination, according to other embodiments of the present invention.

Reference is now made to FIG. 9, a side view illustration of the imaging device 300, having two adjacent image sensors and providing a substantially uniform illumination, according to other embodiments of the present invention. Imaging device 300 includes a body 310 enclosing an imaging-optical-chamber, a pair of image sensors 350, one or more light sources 330, light-occluding structure 390, mirrors 380 and a glass-window 320. The imaging-optical-chamber is enclosed by glass-window 320 and by a body 310, body 310 including camera wall 355 and side walls 375.

Cameras 350 are disposed on a camera wall 355 such that the combined primary FOV 360 of cameras 350 views at least the whole of glass-window 320. Light sources 330 and light-occluding structure 390 are securely attached to either the internal surface of camera wall 355 or to the internal surface of selected side walls 375. Light sources 330 are typically attached by light source holders 332.

Light sources 330 and light-occluding structure 390 are disposed in a preconfigured location inside the imaging-optical-chamber, such that light-occluding structure 390 delimits the combined primary FOV 360 of cameras 350 to preferably view at least the whole of glass-window 320. The preconfigured location of light sources 330 is in occluded shelter zones formed by light-occluding structure 390, inside the imaging-optical-chamber. Furthermore, light-occluding structure 390 is disposed inside a mutual extended FOV, denoted by virtual lines 368, situated within the combined primary FOV 360 of cameras 350.

Primary FOV 360 of each camera 350 is denoted by the virtual lines 362 and 368, and combined extended FOV 364 of cameras 350 is denoted by virtual lines 366. The optical effect of mirrors 380 is such, as if light source 330a is positioned at the position of imaginary light source 330a' (as denoted by optical paths of light rays 335), and similarly for all individual light sources 330. The combined FOV of cameras 350 is denoted in FIG. 9 by the striped region.

The preconfigured location of light sources 330 is such that light-occluding structures 390 delimit the light arrays emitted from light sources 330 illuminate coupled mirrors 380, such that all light arrays, reflected from mirrors 380, cover substantially all of glass-window 320. Optionally, each imaginary light source 330' illuminates a portion of glass-window 320, wherein the combination of all imaginary lights sources 330' illuminate the whole of glass-window 320. Light-occluding structure 390 forms gaps d3, through which gap d3 the light arrays emitted from light sources 330 illuminate coupled mirrors 380 and thereby, glass-window 320.

In variations of the present, the camera system may include more than two image sensors, such that the combined FOV of all image sensors covers a continuity of the glass-window (20) area. Preferably, the image sensors are disposed such that that the combined FOV of all image sensors covers a rectangular region of the glass-window (20) area.

For the sake of clarity, light sources 130, 230 and 330 may be any type of light source, preferably LED light sources, including IR, UV and visible light LED light sources or a combination thereof. Optionally, the light source is a halogen light source.

Florescence image of the document may be acquired by illuminating the document with excitation light in UV, NUV or blue wavelength and acquiring data from the green and red sensitive pixels of a color sensitive sensor array. An optical filter designed to block the excitation wavelength may be used to protect the sensor.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A camera system for imaging a document comprising:
   (a) an enclosed imaging-optical-chamber;
   (b) at least one camera mounted inside said imaging-optical-chamber, wherein said camera is configured to acquire image frames of at least a portion of the document, and wherein said camera includes a lens defining the primary FOV of said camera;
   (c) at least one light source for illuminating said portion of the document being imaged;
   (d) at least one light-occluding structures, wherein each of said light sources is operatively coupled with at least one of said light-occluding structures;
   (e) a glass-window, wherein the document is operatively disposed on the external surface of said glass-window, and wherein said glass-window extends the FOV of said camera thereby forming an extended FOV of said camera; and
   (f) at least one mirror operatively coupled with at least one of said light sources,
   wherein said at least one light source is disposed inside said primary FOV of said camera;
   wherein each of said light-occluding structures prevents each of said operatively coupled light sources from directly illuminating said glass-window;
   wherein each of said light-occluding structures facilitates each of said operatively coupled light sources to directly illuminate said operatively coupled mirror; and
   wherein the light rays illuminating said mirrors reflect from said mirrors to illuminate at least a portion of said glass-window, and thereby, also illuminate said portion of the document being imaged.

2. The system of claim 1, wherein the document is an identity document.

3. The system of claim 1, wherein said at least one light source is disposed inside said primary FOV of said camera, such that the imaginary light-source of said light source is disposed outside said extended FOV of said camera.

4. The system of claim 1, wherein all internal walls of said imaging-optical-chambers, except for said at least one mirror and said glass-windows, are painted in black.

5. The system of claim 1, wherein at least a portion of the internal walls of said imaging-optical-chambers, except for said at least one mirror and said glass-windows, coated with light absorbing material.

6. The system of claim 1, wherein said at least one light source of said illumination system is selected from the group of light sources type: Infra Red (IR), Ultra Violate (UV), Visible Light (VL) and fluorescence image.

7. The system of claim 1, wherein said at least one light source of said illumination system is a LED light source.

8. The system of claim 1, wherein said at least one light source of said illumination system is a halogen light source.

9. The system of claim 1, wherein all walls of said optical chamber are opaque, except for said glass-window.

10. A method for imaging a document, comprising the steps of:
   (a) providing a camera system including:
      i. an enclosed imaging-optical-chamber;
      ii. at least one camera mounted inside said imaging-optical-chamber, wherein said camera is configured to acquire image frames of at least a portion of the document, and wherein said camera includes a lens defining the primary FOV of said camera;
      iii. at least one light source for illuminating said portion of the document being imaged;
      iv. at least one light-occluding structures, wherein each of said light sources is operatively coupled with at least one of said light-occluding structures;
      v. a glass-window, wherein the document is operatively disposed on the external surface of said glass-window, and wherein said glass-window extends the FOV of said camera thereby forming an extended FOV of said camera; and
      vi. at least one mirror operatively coupled with at least one of said light sources, by said at least one camera,
      wherein said at least one light source is disposed inside said primary FOV of said camera, such that the imaginary light-source of said light source is disposed outside said extended FOV of said camera;
   (b) illuminating the document with said at least one imaginary light-sources; and
   (c) acquiring at least one image frame of at least a portion of the document.

* * * * *